United States Patent [19]

Kickuth

[11] Patent Number: 4,904,386

[45] Date of Patent: Feb. 27, 1990

[54] METHOD OF PURIFYING LIQUIDS LIKE WASTEWATER BY MEANS OF A FILTER BED CONTAINING AQUATIC PLANTS PLANTED IN SUCH FILTER BED

[76] Inventor: Reinhold W. Kickuth, Gilsbergstrasse 9, D-3436 Hess.-Lichtenau, Fed. Rep. of Germany

[21] Appl. No.: 329,769

[22] Filed: Mar. 28, 1989

Related U.S. Application Data

[62] Division of Ser. No. 31,339, Mar. 26, 1987, Pat. No. 4,855,040.

[30] Foreign Application Priority Data

Mar. 27, 1986 [GB] United Kingdom ............... 86 07653

[51] Int. Cl.⁴ ................................................ C02F 3/32
[52] U.S. Cl. ..................... 210/602; 210/614; 210/617; 210/744; 210/747
[58] Field of Search ............... 210/602, 614, 617, 744, 210/747, 101, 104, 109-111, 116, 150, 151, 134, 135, 137, 170, 251

[56] References Cited

U.S. PATENT DOCUMENTS

| | | | |
|---|---|---|---|
| 3,770,623 | 11/1973 | Seidel | 210/602 |
| 3,789,986 | 2/1974 | Oldham et al. | 210/151 |
| 4,169,050 | 9/1979 | Serfling et al. | 210/602 |
| 4,303,350 | 12/1981 | Dix | 210/170 X |
| 4,331,538 | 5/1982 | Kickuth | 210/602 |
| 4,333,837 | 6/1982 | Plosz et al. | 210/170 X |
| 4,388,357 | 6/1983 | Luebke | 210/170 X |
| 4,415,450 | 11/1983 | Wolverton | 210/602 |
| 4,678,582 | 7/1987 | Lavigne | 210/150 |
| 4,793,929 | 12/1988 | Kickuth et al. | 210/602 |
| 4,824,572 | 4/1989 | Scott | 210/602 |
| 4,839,051 | 6/1989 | Higa | 210/602 |

FOREIGN PATENT DOCUMENTS

| | | |
|---|---|---|
| 0028360 | 10/1980 | European Pat. Off. . |
| 2210619 | 9/1973 | Fed. Rep. of Germany . |
| 2418979 | 10/1975 | Fed. Rep. of Germany . |
| 3406004 | 8/1985 | Fed. Rep. of Germany . |

OTHER PUBLICATIONS

"Root-Proximate Reaction Zones in Hydromorphic Soils" by Reinhold Kickuth and Hans-Joachim Grommelt, Int. Symp. Gumpenstein, 1982.
"Report of a visit by Arthur G. Boon, Dr. Robert D. Davis and Dr. Robert J. Huggins to Germany (GFR) to Investigate the Root Zone Method", Jan., 1985.

*Primary Examiner*—Tom Wyse
*Attorney, Agent, or Firm*—Laney, Dougherty, Hessin & Beavers

[57] ABSTRACT

The filter bed containing aquatic plants planted therein is provided with a lengthwise and/or transverse drainage arrangement containing a predetermined number of drain pipes. Particularly during the growth phase of the aquatic plants, the drainage arrangement constitutes a by-pass flow path by-passing the aquatic plant-containing filter bed. The throughflow through such by-pass flow path is controlled as a function of the operating conditions using adjustable control devices. Furthermore and in order to also control the hydromorphous conditions of the aquatic plant-containing filter bed, outfeed level control devices are provided for controlling the hydraulic gradient along substantially the entire aquatic plant-containing filter bed as a function of its operating conditions. The throughflow through the aquatic plant-containing filter bed thus can be controlled for achieving optimum purification of the inflowing liquid under substantially all occurring operating conditions.

25 Claims, 3 Drawing Sheets

METHOD OF PURIFYING LIQUIDS LIKE WASTEWATER BY MEANS OF A FILTER BED CONTAINING AQUATIC PLANTS PLANTED IN SUCH FILTER BED

This is a division of application Ser. No. 07/031,339, filed Mar. 26, 1987, now U.S. Pat. No. 4,855,040.

BACKGROUND OF THE INVENTION

The present invention relates to a new and improved method of, and installation for, purifying liquids like wastewater by means of a filter bed containing aquatic plants planted in such filter bed.

In its more particular aspects, the present invention specifically relates to a new and improved method of, and installation for, purifying liquids like wastewater by means of a filter bed containing aquatic plants planted in such filter bed and in which method and installation the liquid to be purified is infed into the aquatic plant-containing filter bed through appropriately constructed inlet or infeed means. The purified liquid which outflows from the aquatic plant-containing filter bed, is received by appropriately constructed outlet or outfeed means.

Aquatic plant-containing filter beds of the aforementioned type have become known in the art during the past 10 to 20 years under various designations such as "Root Space Beds", "Aquatic Bed Purification Stages", "Reed-type Purification Installations" and so forth. In the following, such known aquatic plant-containing filter beds will be described briefly with respect to their construction and mode of operation.

In installations of the aforementioned type the liquid to be treated like, for example, wastewater substantially horizontally percolates or seeps through a soil matrix which is formed by the aquatic plant-containing filter bed. This soil matrix is provided with a secondary structure and thereby with high hydraulic conductivity due to the physical, chemical and biological activity of the roots and rhizoms of preselected aquatic plants. After a number of years, the hydraulic conductivity can assume values in the range of about $K_f = 10^{-3}$ m/sec. Due to the continual mechanical and chemical activity and particularly due to continual mass exchange of the subterraneous organs or elements, the high permeability coefficients $k_f$ remain preserved even during continuous liquid infiltration or infeed. The aforementioned effects can connteract even an obstruction of the soil pores by means of solid materials entrained by the liquid to be purified.

The physical, chemical and biological processes which are determinant for the intended changes in the infiltrated liquid to be purified are irrelevant to the inventive control operations and, therefore, are here not discussed. These processes are described in detail in other publications, see, for example, applicant's German Patent Publications No. 2,944,421, published Nov. 3, 1979, and European Pat. No. 0,028,360, published Apr. 20, 1983; publication by R. Kickuth, H. J. Grommelt, entitled "Wurzelnahe Reaktionszonen in hydromorphen Böden", in Int. Sympos. Gumpenstein 1982, pages 681 to 688; German Patent Publication No. 3,406,004, published Feb. 20, 1984; German Patent Publication No. 2,418,979, published Apr. 19, 1974; publication by A. G. Boon, entitled "Report of a Visit by Members and Staff of WRC to Germany to Investigate the Root Zone Method for Treatment of Waste Waters", Water Research Processes, Aug. 1985; publication by L. Rodewald-Rudescu, entitled "Das Schilfrohr", in Die Binnengewässer, Vol. XXVII, Schweizerbartsche Verlagsbuchhandlung Stuttgart, 1974.

Generally, the body of soil which therefore is effective and forms the aquatic plant-containing filter bed, is sealed from the subsoil in any conventional suitable manner in order to block leakage of the liquid to be purified in a direction towards ground water and to ensure the substantially horizontal percolation or seepage which is typical for such purifying system, through the aquatic plant-containing filter bed.

The transport of the liquid to be treated in this manner is described by the transport equation $$\phi \,(m^2) = \frac{Q\,(m^3/sec)}{v\,(m/sec)}$$

Therein $v = k_f(m/sec) \times dh/ds$ according to DARCY is the flow rate of the liquid along a hydraulic gradient $dh/ds$ in a substrate having the permeability coefficient $k_f(m/sec)$ and the infiltration or infeed cross-sectional area $\phi$ $(m^2)$ for transporting or passing-through the liquid to be treated in this manner at a throughput Q $(m^3/sec)$.

The coarse pore structure in the root area of the planted aquatic plants and which coarse pore structure is typical for the purification process and determinant for the transport of liquid, is formed from the given starting material due to restructuring and aggregating processes. In most cases the starting material constitutes a comparatively heavy soil containing significant proportions of fine and coarse clay.

The purification process employing aquatic plant-containing filter beds thus is distinctly different from all classic infiltration methods based on the transport capacity of a predetermined coarse-grained structure such as formed by coarse sand, gravel and so forth.

The initially mentioned methods and installations utilizing comparatively heavy soil which is aggregated and restructured for use as the aquatic plant-containing filter bed, achieve discrete activity increases, however, still possess significant operational disadvantages and still posses significant operational disadvantages and problems which will be explained in more detail hereinafter.

Generally, the biogenous restructurization and aggregation of the aquatic plant-containing filter bed by means of the aforementioned aquatic plants requires relatively long periods of time so that there may elapse four and, in some cases, even more years from the construction until the full activity of the installation.

Only after the aquatic plant-containing filter bed has been fully developed to its climax state due to the activity of the subterraneous organs, there can be expected permeability coefficients in the range of $k_f = 10^{-3}$ m/sec whereupon the dimensions of such installations have been based with respect to the flow cross-sectional area $\phi$.

The permeability coefficient $k_f$ thus develops in the manner as illustrated in FIG. 5 and therefore does not permit, during the pre-phase of the operation, percolation or throughflow of the full liquid throughput Q for which the installation has been dimensioned.

If, however, the installation must accept the full liquid throughput Q from the start, which generally is the case in wastewater treatment, then, more or less considerable partial flows must be conducted away via the planum, i.e. the installation surface. Although such partial flow is subject to even favorable chemical and biological changes during contact with the surface of the aquatic plant-containing filter bed, such operational states or conditions are problematic for the following reasons:

(i) wastewater running off along the surface may cause malodorous burdens and aesthetically objectionable situations;

(ii) erosion grooves or flutes may be formed in the surface of freshly planted or still biogenously unstabilized filter beds and the medium to be treated or liquid to be purified flows nearly unchanged therethrough towards the outlet or outfeed;

(iii) the freshly planted or biogenously still unstabilized filter beds do not yet bring the full throughput capacity;

(iv) also the liquid to be purified and which liquid substantially vertically enters the aquatic plant-containing filter bed, may produce erosion phenomena, for example, dislocations of fine particles within the soil matrix of the aquatic plant-containing filter bed.

Furthermore and with fully developed installations of this type, there exists the problem that variable infeed rates of the liquid to be purified, for example, during dry phases and wet phases due to different rain water arrivals, cause variations in the hydromorphous condition and thus in the purification efficiency of the aquatic plant-containing filter bed.

SUMMARY OF THE INVENTION

Therefore, with the foregoing in mind, it is a primary object of the present invention to provide a new improved method of, and installation for, purifying a liquid by means of an aquatic plant-containing filter bed and which method and installation is not afflicted with the aforementioned shortcomings and drawbacks of the prior art.

An important object of the present invention is directed to providing a new and improved method of, and installation for, purifying a liquid by means of an aquatic plant-containing filter bed and which method and installation permit optimum adaptation of the purifying action which is achieved by the aquatic plant-containing filter bed, to the instant operating conditions.

Now in order to implement these and still further objects of the invention, which will become more readily apparent as the description proceeds, the method of the present development is manifested by the features that, there is adjusted in the aquatic plant-containing filter bed a predetermined throughflow pattern which is adapted to the instant operating conditions.

As alluded to above, the present invention is not only concerned with the aforementioned method aspects but also concerns a new and improved construction of an installation for carrying out such method. Generally speaking, the installation comprises an aquatic plant-containing filter bed, inlet or infeed means through which the liquid to be purified is infed into the aquatic plant-containing filter bed, and outlet or outfeed means receiving purified liquid which issues from the aquatic plant-containing filter bed.

In its more particular aspects, the inventive installation, for the purpose of achieving the aforementioned measures, contains throughflow control means for adjusting in the aquatic plant-containing filter bed, a predetermined throughflow pattern which is adapted to the instant operating conditions of the aquatic plant-containing filter bed.

According to the inventive method as well as according to the inventive installation the throughflow pattern selectively is determined by individual ones or a combination of the following features:

(i) proportional throughflows through the aquatic plantcontaining filter bed and at least one by-pass flow path extending substantially parallel to the aquatic plant-containing filter bed;

(ii) substantially adjacent zones which extend substantially transverse through the aquatic plant-containing filter bed and have an increased hydraulic gradient; and (iii) the hydraulic gradient between the height of the infeed level at the inlet or infeed means and the height of the outfeed level at the outlet or outfeed means.

In one embodiment of the inventive method and the inventive installation containing by-pass flow paths which may be constructed as a gravel bed or lengthwise drain pipes or tubes, the throughflow control is effected using adjusting means for varying the flow cross-sectional area on the outlet or outfeed side. As a result, the proportional throughflow through the by-pass flow path is adapted to the instant operating conditions of the aquatic plant-containing filter bed. In this manner there can be avoided the aforementioned problems resulting from surface run-off and surface erosion of the aquatic plant-containing filter bed.

Advantageously, in the inventive installation containing a gravel bed as the by-pass flow path, the gravel bed is covered on the side facing the aquatic plant-containing filter bed by means of a cover or foil which is degradable under the action of the aquatic plant-containing filter bed. In this manner there is effectively prevented vertical erosion within the aquatic plant-containing filter bed during the aforementioned pre-phase.

In a further embodiment of the inventive method and the inventive installation the substantially adjacent zones having an increased and variable hydraulic gradient, are formed by by-pass flow paths containing a predetermined number of substantially transverse drain pipes or tubes each of which is placed at the bottom of the aquatic plant-containing filter bed on the downstream side of the associated zone and connected to a common transverse drain outfeed or outlet. The throughflow control is effected by adjusting means for varying the flow cross-sectional area either of the individual substantially transverse drain pipes or tubes or the common transverse drain outfeed or outlet. As a result, the hydraulic gradient in each zone is adapted to the instant operating conditions of the aquatic plant-containing filter bed. In this manner the overall throughput of the aquatic plant-containing filter bed can be significantly enhanced also during the prephase.

In a still further development of the inventive method and the inventive installation the hydraulic gradient between the height of the infeed level and the height of the outfeed level is adjusted using means for adjusting the height of the outfeed level. For such outfeed level height adjustment, then therefore at least one outfeed pipe or tube of the outlet or outfeed means is provided, for example, with a flexible tube, tubular plug-on modules or a pivotable branch pipe or tube having a free open end which assumes a preselectable length or height above the outfeed pipe or tube. As a result, the throughput can be adapted to the infeed rate of the liquid to be purified. In this manner there can be preserved a substantially complete hydromorphous condition and thus optimum purification power of the aquatic plant-containing filter bed under the most various operating conditions.

BRIEF DESCRIPTION OF THE DRAWINGS

The invention will be better understood and objects other than those set forth above, will become apparent when consideration is given to the following description thereof. Such description makes reference to the annexed drawings wherein the same reference characters have been used to designate the same or analogous components and wherein.

DETAILED DESCRIPTION OF THE PREFERRED EMBODIMENTS

Figure 1:
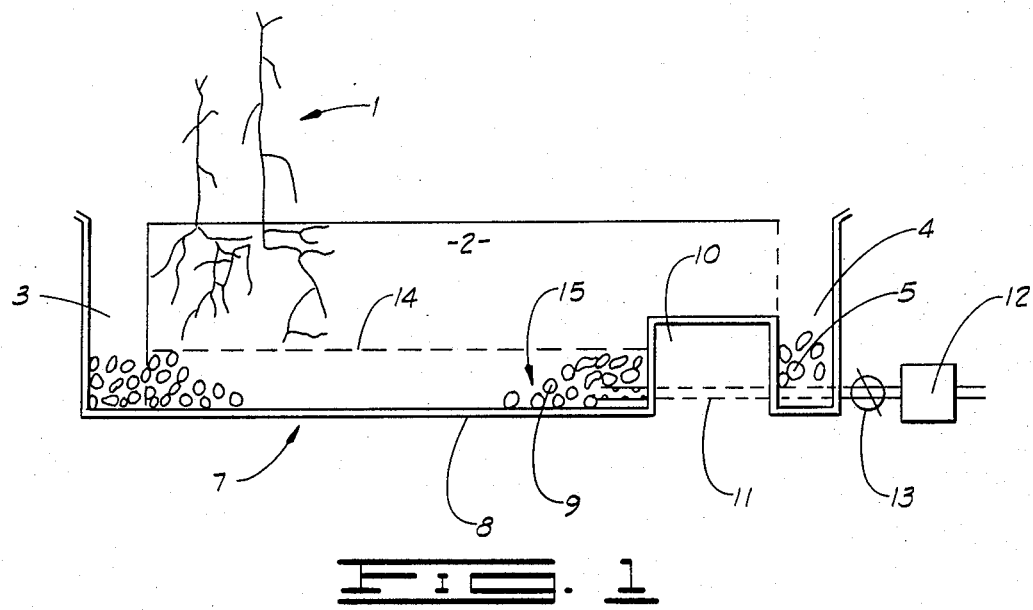
FIG. 1 is a schematic sectional illustration of a first exemplary embodiment of the inventive installation containing throughflow control means for controlling proportional throughflows.

Describing now the drawings, it is to be understood that only enough of the construction of the aquatic plant-containing filter bed has been shown as needed for those skilled in the art to readily understand the underlying principles and concepts of the present development, while simplifying the showing of the drawings. Turning now specifically to FIGS. 1 to 4a, b, c, there have been illustrated therein by way of example and not by way of limitation, exemplary embodiments of the inventive installation for purifying liquids, for example, wastewater using an aquatic plant-containing filter bed. The exemplary embodiments contain throughflow control means for adjusting or creating related predetermined throughflow patterns in the aquatic plant-containing filter bed. Each such throughflow pattern permits optimum adaptation of the throughflow or throughput through the aquatic plant-containing filter bed to the respective instant operating condition of such filter bed. These operating conditions can occur simultaneously or sequentially at the same aquatic plant-containing filter bed and, therefore, it is self-evident that individual ones or certain preselected combinations or all of the throughflow control means which will be described hereinafter and which are individually illustrated in the drawings, can be provided at a given aquatic plant-containing filter bed.

The structure and construction of aquatic plant-containing filter bed is known in principle from the initially recited literature. Therefore, it is here only briefly and summarizingly mentioned that a bed of a size which is determined by its purpose of use, is broken from the ground and lined at the bottom and at the side walls by means of a membrane or foil which is impervious for the liquid to be purified. Inlet or infeed means through which the liquid to be purified is infed into the aquatic plant-containing filter bed, and outlet or outfeed means which receive the purified liquid issuing from the aquatic plant-containing filter bed and lead to a receiving water, are formed at the end sides or faces of the aquatic plant-containing filter bed. A bottom gradient which is not illustrated in the drawings, in the range of 1% to 8% is provided between the inlet or infeed means and the outlet or outfeed means. The bed cavity is filled with a suitable soil body which may constitute grey-brown podzolic soil (B-horizon) or a monolithic soil prepared from clayey sand and therein there are planted aquatic plants of the species Phragmites, Iris, Scirpus and the like. Generally there are utilized for this purpose plants which are capable of supplying oxygen via their aerenchymatic tissue to the adherent root space or rhizosphere and to thereby form in the hydromorphous soil matrix a pattern of aerobic and anaerobic compartments responsible for the purifying action or power of the aquatic plant-containing filter bed.

In the first exemplary embodiment of the inventive installation for purifying liquids like wastewater and which is shown in a sectional illustration in FIG. 1, there will be recognized a filter bed 2 containing aquatic plants 1 and provided on one end side or face with inlet or infeed means 3 in the form of a gravel-filled inlet or infeed ditch. At the opposite end side or face there are located outlet or outfeed means 4 constructed as a gravel-filled outlet or outfeed ditch. Within the outlet or outfeed means 4 there extends substantially transverse to the filter bed 2, an outlet or outfeed pipe or tube 5 which is constructed in the manner of a drain pipe or tube and which receives the purified liquid issuing from the filter bed 2 and which leads to a control or inspection chamber or to the receiving water. Instead of the outlet or outfeed pipe or tube 5 there may also be provided a predetermined number of outlet or outfeed pipes or tubes which are constructed substantially in the manner of the outlet or outfeed pipe or tube 40 shown in FIG. 4a and pass the purified liquid from the aquatic plant-containing filter bed 2 into the outlet or outfeed means 4. The bottom 7 and the side walls of the filter bed 2 are covered by a foil 8 which is impermeable or impervious for water.

A gravel bed or layer having a thickness in the range of 15 to 20 cm is arranged intermediate the filter bed 2 and the foil 8 providing a seal against the body of ground water. On the outlet or outfeed side, the gravel bed or layer 9 is blocked by means of an outflow bar 10 in the form of, for example, a soil block measuring up to 40 cm in height and exceeding the height dimension of the gravel bed or layer 9 by, for example, up to 25 cm. The foil 8 is passed over the outflow bar 10 or soil block. The outflow bar 10 and the foil 8 are traversed by one or a plural number of discharge pipes or tubes 11 only one of which is visible in FIG. 1. The discharge pipes or tubes 11 are connected to a common gravel bed outlet or outfeed 12 which leads to an outflow duct. In the illustrated exemplary embodiment the or each discharge pipe or tube 11 is provided with preferably continuously adjustable adjusting means 3, for example, valve means of any appropriate type for adjusting the flow cross-sectional area of the associated discharge pipe or tube 11 to values which are adapted to the instant operating conditions of the installation. Instead, the adjusting means 13 also may be arranged at the common gravel bed outlet or outfeed 12.

The gravel bed or layer 9, particularly during the prephase of the aquatic plant-containing filter bed 2, possesses in comparison to the aquatic plant-containing filter bed a significantly higher hydraulic conductivity and extends substantially parallel to the aquatic plant-containing filter bed 2 between the inlet or infeed means 3 and the outlet or outfeed means 4. During the operation of the installation, therefore, the gravel bed or layer 9 and the discharge pipes or tubes 11 form a by-pass flow path 15 and the adjusting means 13 adjust or control the throughflow through the by-pass flow path 15. In this installation the by-pass flow path 15 and the adjusting means 13 which govern the by-pass flow path 15, constitute throughflow control means by means of which there is formed in the installation a throughflow pattern which is determined by the proportional throughflows through the aquatic plant-containing filter bed 2 and the by-pass flow path 15.

Thus, by opening the adjusting means 13 in the by-pass flow path 15 there can be produced any desired short-circuit flow between the inlet or infeed means 3 and the outlet or outfeed means 4 whereby excessive amounts of liquid can be passed through in accordance with the instant state of development of the hydraulic conductivity in the aquatic plant-containing filter bed 2. During such operation there occurs, depending upon the used type of gravel, a quite considerable chemical and biological change in the percolating or throughflowing liquid, particularly when basic gravel material is used.

Appropriately the by-pass flow path 15 or the gravel bed or layer 9 is covered on the side facing the superposed active body of soil, by means of a foil 14 which is degradable under the action of the aquatic plant-containing filter bed 2 and is made of, for example, non-woven textile material, jute or cellulose webs. There is thus prevented, during the constructional work, the penetration of fine-grained soil from the aquatic plant-containing filter bed 2 into the gravel body of the gravel bed or layer 9. During the development of the aquatic plant-containing filter bed it is quite intended that, after degradation of the foil 14, the plant roots and the fine-grained soil migrate into the gravel body of the gravel bed or layer 9 and thus convert the same to a higher state of activity in terms of the purification to be achieved.

In addition to the extraordinary effect of the gravel bed or layer 9 with respect to achieving the desired throughflow pattern, a further advantage resides in the fact that, particularly when there is used rounded gravel particles like, for example, coarse gravel, and a packing layer of about 20 cm, the water impervious foil 8 which is placed thereunder, can be subjected to the action of heavy-duty construction machinery. There are thus facilitated the constructional measures required for placing the effective body of soil.

Instead of the gravel bed or layer 9 which constitutes the intentionally adjustable or variable by-pass flow path 15, the aquatic plant-containing filter bed 2 can also be equipped with lengthwise drain means which are effective in the flow direction of the liquid to be treated or purified. In principle, the arrangement and mode of operation of such lengthwise drain means is substantially the same or similar to those of the gravel bed or layer 9 described hereinbefore.

Figure 2:
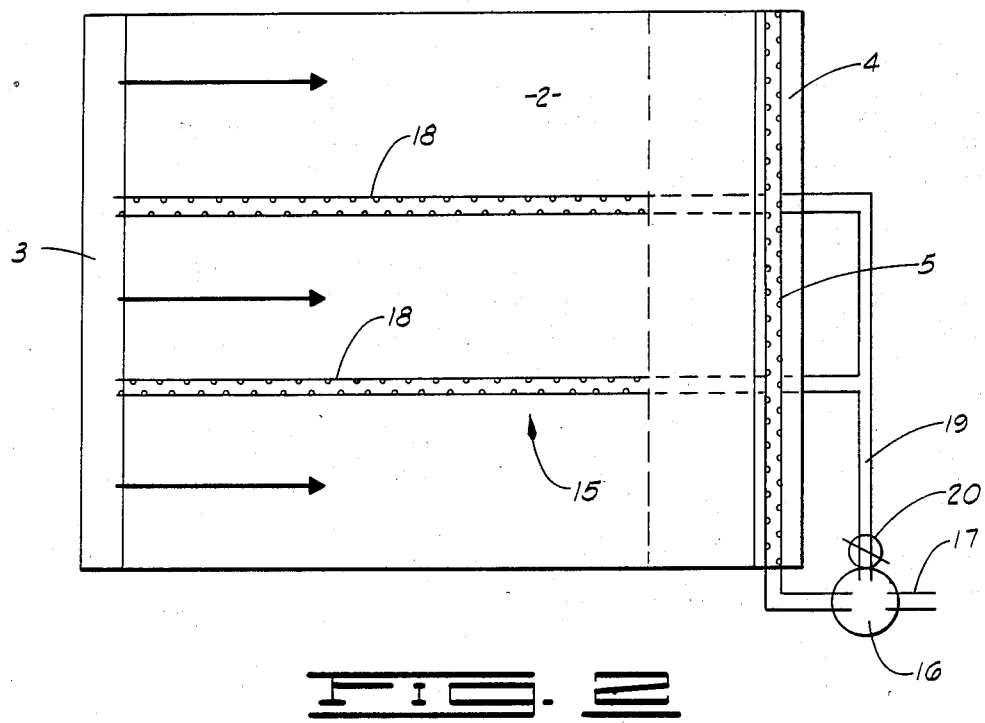
FIG. 2 is a schematic top plan view of a second exemplary embodiment of the inventive installation containing throughflow control means for controlling proportional throughflows.

Such installation is illustrated as a second exemplary embodiment of the inventive apparatus in top plan view in FIG. 2. There will be recognized the aquatic plant-containing filter bed 2 containing inlet or infeed means 3 and outlet or outfeed means 4 possessing an outlet or outfeed pipe or tube 5 connected to a control or inspection chamber 16 which leads to a receiving water via further outlet or outfeed means 17. In this case the by-pass flow path 15 is formed by a predetermined number of lengthwise drain pipes or tubes 18. This number is predetermined by the flow cross-sectional area $\phi$ and two such lengthwise drain pipes or tubes 18 are provided in the illustrated exemplary embodiment. The lengthwise drain pipes or tubes 18 extend between the inlet or infeed means 3 and the outlet or outfeed means 4 substantially parallel to the aquatic plant-containing filter bed 2 and are preferably laid at the bottom thereof. The lengthwise drain pipes or tubes 18 are connected to a common lengthwise drain outlet or outfeed 19 which also leads to the control or inspection chamber 16. In the illustrated exemplary embodiment the common lengthwise drain outlet or outfeed 19 is provided with preferably continuously adjustable adjusting or control means 20 like, for example, valve means of any appropriate type by means of which there can be adjusted or controlled the lengthwise drain outflow by adjusting the flow cross-sectional area in adaptation to the instant operating conditions of the installation. Instead and in correspondence with the illustration in FIG. 1, independent and individually adjustable adjusting or control means may be provided at each individual lengthwise drain pipe or tube 18.

In this arrangement, no outflow blocking bar of the type as illustrated in FIG. 1 in combination with the gravel bed or layer 9 is required. However, also in this embodiment, the lengthwise drain pipes or tubes 18 are continued as circumferentially closed pipes or tubes outside the aquatic plant-containing filter bed 2.

The aforedescribed lengthwise drain means are not quite as effective as the gravel bed or layer 9 below the aquatic plant-containing filter bed 2, however, in most cases can be more readily installed in terms of construction technology and mostly are less expensive. Naturally, the sealing or water impervious foil 8 in this arrangement is not protected against the passage of heavy-duty construction machinery.

By means of the by-pass flow path 15 there can not only be effectively overcome hydraulic bottlenecks which occur during the pre-phase or development period of the aquatic plant-containing filter bed in the inventive installation, but there can also be reliably brought about the dry phases which are required during such pre-phase or development period. Such brief dry phases are of great advantage for a more rapid and effective in-depth development of the subterraneous plant organs to the standard depth of about 0.6 m which is typical for such installations. According to present knowledge, the brief dry phases should fall within the main advancing periods of the subterraneous organs, i.e. within early and late winter, see, for example, the initially mentioned publication by L. Rodewald-Rudescu. During this period, however, effective drainage can hardly be achieved particularly in the heavy soils used in the installations of the type as described without employing an effective drainage system. Also in this respect the presently described throughflow control has proven at least advantageous if not indispensible.

In the installations described hereinbefore the throughflow control means were effective for controlling the throughput Q of liquid through the installation by adjusting or controlling the throughflow through the by-pass flow path 15.

Figure 3:
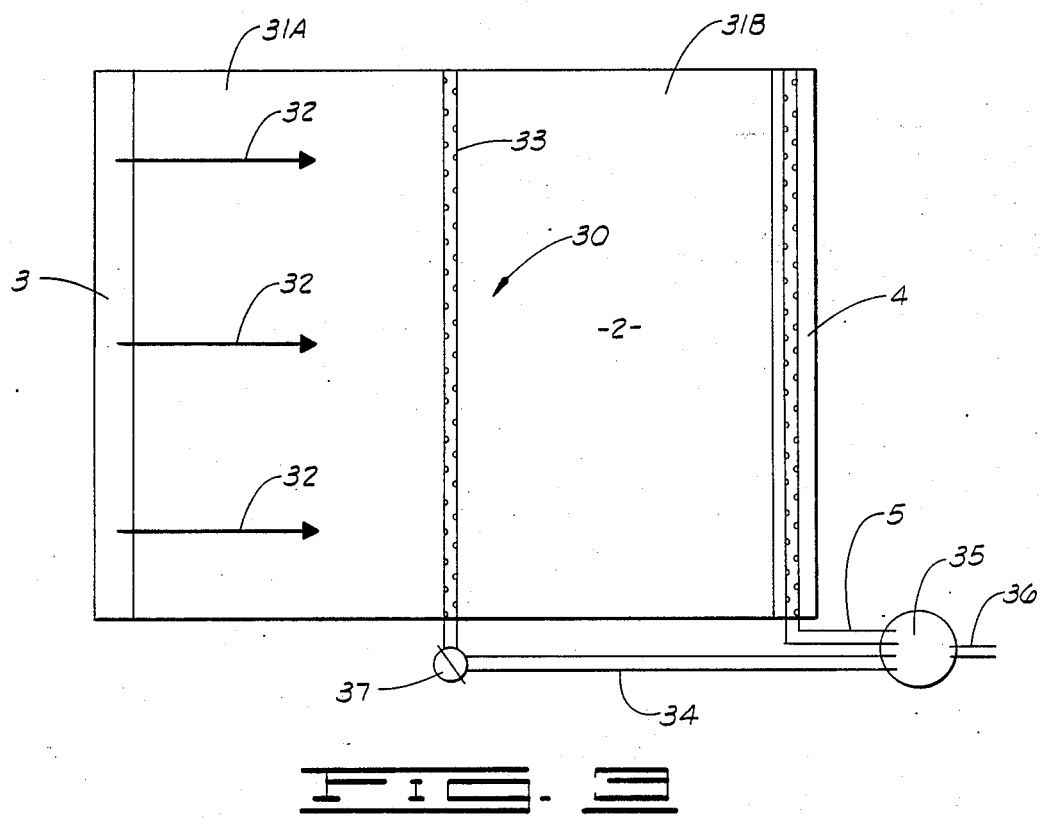
FIG. 3 is a schematic top plan view of a third exemplary embodiment of the inventive installation containing zone-forming means for forming zones having an increased hydraulic gradient.

The third exemplary embodiment described hereinbelow with reference to FIG. 3 is based on a different principle.

According to the initially recited transport equation the throughput Q or the amount of throughflow per unit time of liquid percolating or seeping through the installation is $$Q(m^3/sec) = \phi(m^2) \times k_f \times dh/ds$$

and thus proportional to the throughflow coefficient $k_f$ of the aquatic plant-containing filter bed 2. As already explained initially, this coefficient $k_f$ does not yet reach, during the first years of the operation, the climax value of about $10^{-3}$ m/sec upon which the dimension of the flow cross-sectional area $\phi$ is based, but develops from small initial or starting values substantially in accordance with the manner illustrated in FIG. 5.

The installation schematically illustrated in top plan view in FIG. 3, like the installations described hereinbefore, contains an aquatic plant-containing filter bed 2 with inlet or infeed means 3 and outlet or outfeed means 4 possessing an outlet or outfeed pipe or tube 5, and permits an increased throughput Q by increasing the hydraulic gradient dh/ds.

For this purpose the aquatic plant-containing filter bed 2 is provided with a by-pass flowpath 30 constituting substantially transverse drainage means which subdivide the aquatic plant-containing filter bed 2 into a predetermined number of adjacent zones or segments 31 A, 31 B, . . . extending substantially transverse to the general throughflow direction 32. The substantially transverse drainage means are formed by a predetermined number of substantially transverserve drain pipes or tubes which are preferably laid at the bottom of the aquatic plant-containing filter bed 2 and on the downstream side of the associated zone or segment.

In the illustrated exemplary embodiment there is only provided one substantially transverse drain pipe or tube 33 which defines the two zones or segments 31 A and 31 B. The substantially transverse drain pipe or tube 33 is connected to a transverse drain outlet or outfeed 34 opening into a control or inspection chamber 35 which is also connected to the outlet or outfeed pipe or tube 5 and leads to the receiving water via a further outlet or outfeed 36. Depending upon the requirements and the dimensions of the installation there can also be provided a number of substantially transverse drain pipes or tubes 33 in a substantially parallel and spaced relationship which are then connected to a common transverse drain outlet or outfeed 34.

The or each individual substantially transverse drain pipe or tube 33 is provided with adjusting or control means 37, for example, valve means of any appropriate type by means of which the flow cross-sectional area of each individual substantially transverse drain pipe or tube 33 can be independently and individually adjusted. Instead, the adjusting or control means 37 may also be provided at the common transverse drain outlet or outfeed 34.

In each one of thus created n zones or segments 31 A and 31 B of the aquatic plant-containing filter bed 2, Q/n portions of the infeed or throughput Q are infiltrated or infed towards the bottom-placed drainage means along a gradient $n \times dh/ds$. Thus there results a multiple of the hydraulic output or yield of the aquatic plant-containing filter bed 2 into which there is originally, i.e. in the absence of the substantially transverse drainage means infiltrated or infed the throughput Q along the hydraulic gradient dh/ds. In this exemplary embodiment thus the substantially transverse drain pipes or tubes 33 form the by-pass flow path 30 and the adjusting or control means 37 adjust or control the throughflow through the by-pass flow path 30. In this installation, therefore, the by-pass flow path 30 and the adjusting or control means 37 which govern this by-pass flow path 30, constitute throughflow control means by means of which there is formed in the installation a throughflow pattern which is determined by the zones or segments 31 A, 31 B . . . having increased hydraulic gradients.

It is one advantage of this exemplary embodiment that there is obtained from the start a high degree of purification of the infiltrated or infed liquid because, in contradistinction to the aforedescribed exemplary embodiments, there are no partial flows which are led in shortcircuit to the outlet or outfeed means 4 but the entire liquid is passed through the active soil body or matrix of the aquatic plant-containing filter bed 2. Advantageously and furthermore the substantially transverse drainage means can be installed subsequently after the aquatic plant-containing filter 2 has been set up and put into operation and also upon the occurrence of a desire for reconstructing the installation. It may be one disadvantage relative to the aforedescribed exemplary embodiments that there exists a narrower control range and partial surface flows which are odorous and act in an erosive manner, cannot be entirely excluded.

Figures 4A, 4B:
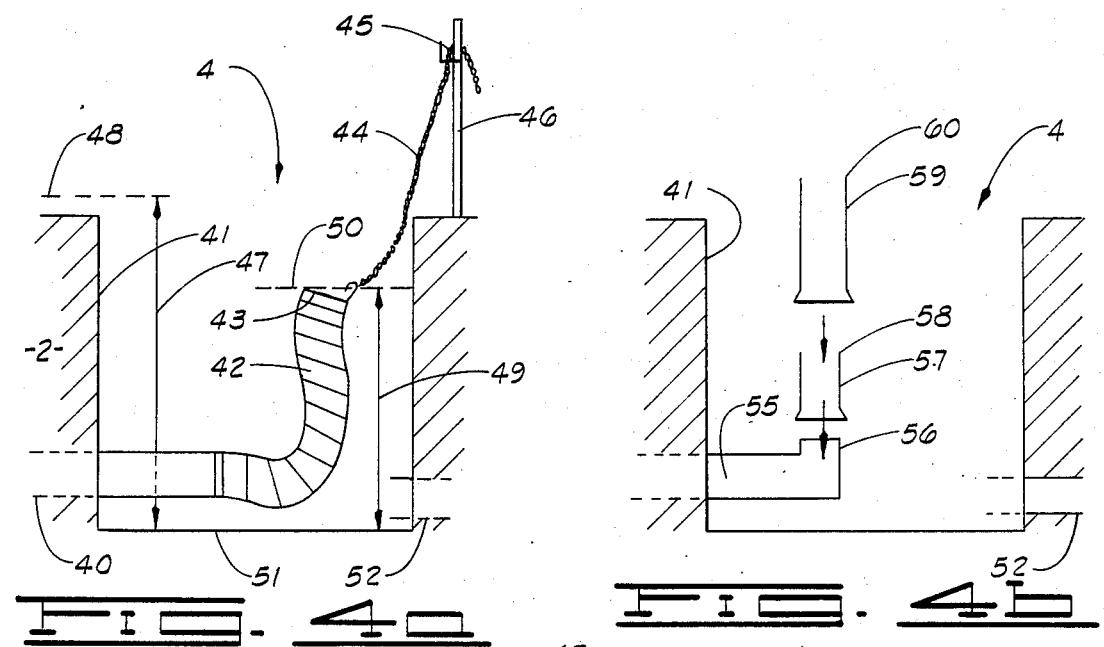
FIGS. 4a to 4c are schematic sectional illustrations of different variants of parts of a fourth exemplary embodiment of the inventive installation containing throughflow control means for controlling the hydraulic gradient between the height of the infeed level and the height of the outfeed level.
Figure 4C:
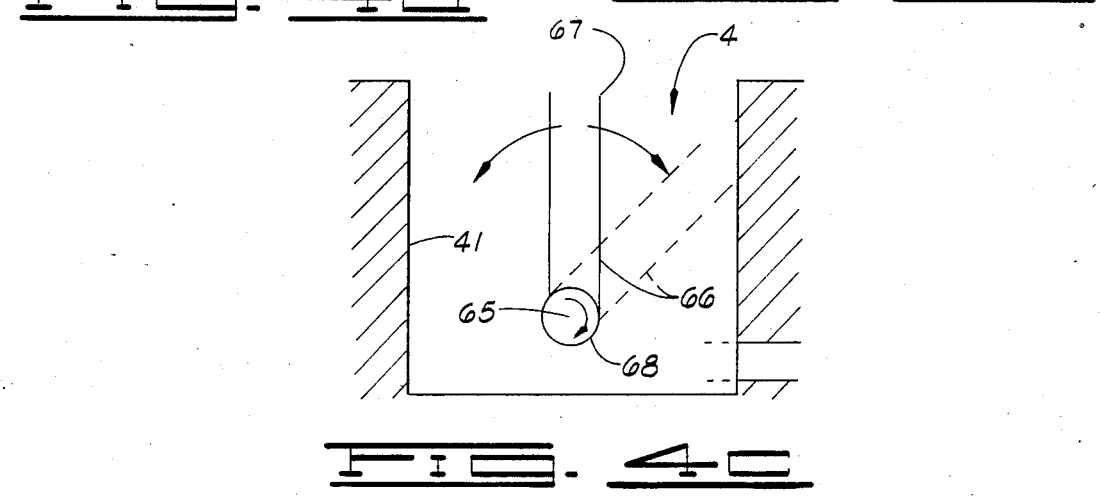

The constructional variants of the fourth exemplary embodiment illustrated in FIGS. 4a to 4c relate to a filter bed installation of the aforedescribed type and, as a matter of simplification, there is only shown the outlet or outfeed means 4. The outlet or outfeed means 4 are provided with outflow level adjusting or controlling means by means of which there can be adjusted as the throughflow pattern of the aquatic plant-containing filter bed 2, the hydraulic gradient between the height of the infeed level at the inlet or infeed means and the height of the outfeed level at the outlet or outfeed means and thus over substantially the entire flow path. Such outflow level adjusting or controlling means can be provided as the sole throughflow control means but advantageously are employed in combination with at least one of the throughflow control means described hereinbefore with reference to the foregoing exemplary embodiments.

According to the dimensioning formula for the surface area requirement of an aquatic plant-containing filter bed installation, the required surface area F is $$F(m^2) = D \times Q_d(m^3/d) \times (\ln c_o - \ln c_T)$$

Therein D is a reaction coefficient specific for the considered material, Q the outflow or throughput per unit time, $c_o$ the infeed concentration of a load to be eliminated from the liquid, and $c_T$ the desired outfeed concentration.

The formula also specifies that there exists a maximum surface area $F_{max}$ which results in the desired outfeed concentration $c_T$ at a determinant diluting infeed $n \times Q_d$ and a correspondingly reduced infeed concentration $c_o/n$. These are presisely the conditions in the regime of the so-called combined wastewater systems in which domestic wastewater arrives at the inlet or infeed means of the active aquatic plant-containing filter bed 2 in a more or less diluted state due to the occurrence of precipitation events. There are known mathematical methods for computing the maximum surface area $F_{max}$, however, they are irrelevant to the inventive installations containing throughflow control means. In any case, such computations in the "worst case" and as a consequence of certain degrees of dilution by external water result in surface area requirements which are significantly above those required for "dryweather" infeed or inflow.

If the aquatic plant-containing filter bed 2 would be demensioned according to the requirements of the least favorable dilution case, the aquatic plant-containing filter bed 2 would be considerably oversized for the "dry-weather" case which constitutes the predominant portion of the operating states or conditions. Such oversize dimensioning, however, is not immaterial or even favorable for the elimination power or capacity of the aquatic plant-containing filter bed installation because the efficiency of the aquatic plant-containing filter bed 2 to a large extent is bound to or determined by the substantially permanent and complete hydromorphous state or condition of the active soil matrix of the aquatic plant-containing filter beds 2. Partially filled aquatic plant-containing filter beds 2 do not develop their full capacity for eliminating nitrogen compounds, phosphates and refractory organic compounds.

This difficulty can be most effectively counteracted by varying, as explained hereinbefore and in accordance with the instant operating conditions, the hydraulic gradient between the height of the infeed level and the height of the outfeed level. As a result, there is varied the advancing or throughflow rate v or the dwell time T of the liquid to be purified in the aquatic plant-containing filter bed 2 such that there is substantially continuously present a hydromorphous soil body or matrix having optimum elimination power or capacity.

In the first variant shown in FIG. 4a, one or a plural number of outlet or outfeed pipes or tubes 40 protrude from the aquatic plant-containing filter bed 2 and open into an outlet or outfeed channel or duct 41 of the outlet or outfeed means 4. Each one of the outlet of outfeed pipes or tubes 40 of which only one is visible in FIG. 4a, is connected on the outlet side to one end of a flexible tube 42 having a free open end 43 which is mounted by connecting means 44, such as a chain at mounting means 45 like a hook-shaped mounting element of a support or stand 46 disposed above the aquatic plant-containing filter bed 2. By varying the connecting length of the connecting means 44 or the height adjustment of the mounting means 45 at the support or stand 46, the height or elevational position of the free open end 43 of the flexible tube 42, i.e. the hydraulic gradient between the height 47 of the infeed level 48 and the height 49 of the outfeed level 50 above the bottom 51 of the outlet or outfeed channel or duct 41 can be varied or adjusted or controlled in adaptation to the instant operating conditions. The outlet or outfeed channel or duct 41 opens into the receiving water via a further outlet or outfeed 52.

A second variant shown in FIG. 4b contains one or a plural number of outlet or outfeed pipes or tubes 55 which protrude from the aquatic plant-containing filter bed 2 and contain an upwardly directed open end 56 within the outlet or outfeed channel or duct 41 of the outlet or outfeed means 4 leading to the receiving water via the further outlet or outfeed 52. The height 49 of the outfeed level 50 in this construction is determined by the elevational position of the free open ends 58 and 60 of respective tubular plug-on modules or elements 57 and 59 of different lengths which can be plugged on to the open end 56 of the outlet or outfeed pipe or tube 55 and which are selected with respect to their length in adaptation to the instant operating conditions.

A third variant shown in FIG. 4c contains, as viewed in the longitudinal direction of the outlet or outfeed channel or duct 41 of the outlet or outfeed means 4, a substantially lengthwise extending outlet or outfeed pipe or tube 65. At its output side this outlet or outfeed pipe or tube 65 is connected with an upwardly bent-off branch pipe or tube 66 using conventional pivot connecting means 68. The branch pipe or tube 66 has a free open end 67. The height 49 of the outfeed level 50 in this construction is determined by the elevational position of the free open end 67 of the branch pipe or tube 66 which can be adjusted to preselected pivot angles in adaptation to the instant operating conditions.

Advantageously, the adjustment or control of the height 49 of outfeed level 50 is effected, instead of using the aforedescribed outlet or outfeed level adjusting or control means, independence upon the hydraulic conditions on the side of the inlet or infeed means 3 by using conventional and therefore here not described preferably automatically controlled valve means.

Apart from their function of controlling the overall hydraulic gradient in filter bed installations of the aforementioned type and which process combined wastewater as mentioned hereinbefore, the outlet or outfeed level adjusting or controlling means illustrated in FIGS. 4to 4c, are highly useful and frequently indispensable in combination with small-size installations having only low surface area requirements and correspondingly short flow paths. The reason is that in the presence of a controllable outlet or outfeed, substantially all length and width relationships of such installations can be realized in the planning stage as well as during construction.

Particularly the aforementioned co-action or cooperation of the aforedescribed throughflow control means permits readily and reliably mastering substantially all of the critical hydraulic situations or conditions in an aquatic plant-containing filter bed during the prephase or development phase and during the various and variable operating conditions thereof. Thus the main obstacles preventing the employment of methods and installations using aquatic plant-containing filter beds can be very effectively overcome.

Figure 5:
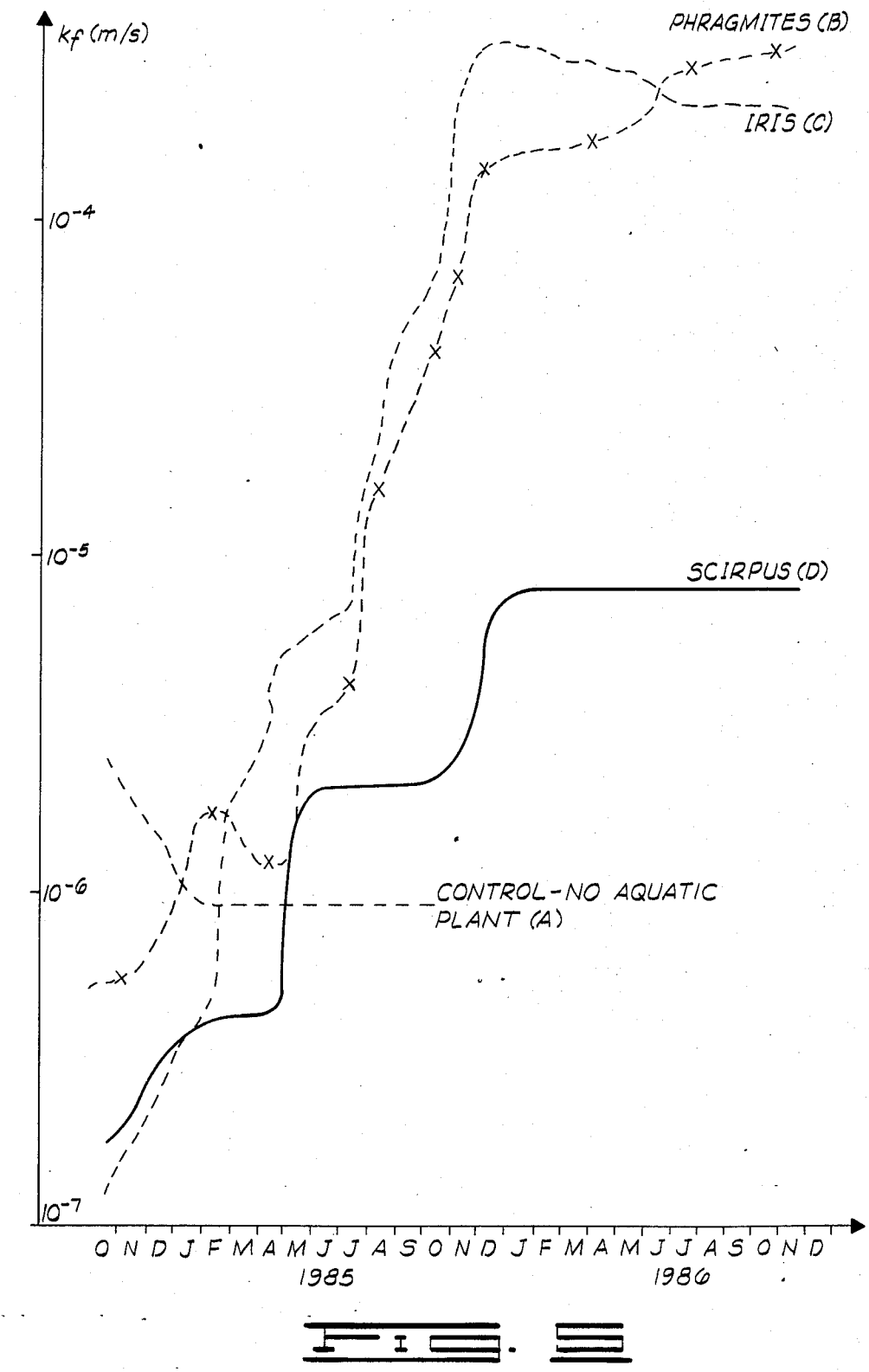
FIG. 5 is a graphic representation showing the variation of the permeability coefficient $k_f$ as a function of time during the pre-phase of the inventive installation implanted with various plant species.

FIG. 5 show in a semi-logarithmic plot the variation of the permeability coefficient $k_f$ in m/sec as a function of time in grey-brown podzolic soil (B-horizon) in the absence of any aquatic plant (A) and in the presence of Phragmites (B) or Iris species (C) as well as in a monolithic soil prepared from clayey sand in the presence of Scirpus species (D).

While there are shown and described present preferred embodiments of the invention, it is to be distinctly understood that the invention is not limited thereto, but may be otherwise variously embodied and practiced within the scope of the following claims.

Accordingly, What I claim is:

1. A method of purifying a liquid, comprising the steps of:

passing the liquid to be purified from infeed means through an aquatic plant-containing filter bed to outfeed means and producing an outflow of liquid from said aquatic plant-containing filter bed;

during said step of passing said liquid to be purified through said aquatic plant-containing filter bed, setting up in said aquatic plant-containing filter bed a predetermined throughflow pattern by controlling the outflow of liquid from said aquatic plant-containing filter bed; and adjusting said outflow and thereby said predetermined throughflow pattern such as to maintain a predetermined hydromorphous state of said aquatic plant-containing filter bed.

2. The method as defined in claim 1, further including the steps of:

determining the height of an infeed level at said infeed means;

determining the height of an outfeed level at said outfeed means;

said step of setting up said predetermined throughflow pattern entails the step of setting up as said predetermined throughflow pattern, the hydraulic gradient between the height of the infeed level at said infeed means and the height of the outfeed level at said outfeed means; and adjusting said height of said outfeed level in order to thereby adapt said hydraulic gradient to said instant operating conditions of said aquatic plant-containing filter bed.

3. The method as defined in claim 2, wherein:

said step of adjusting said height of said outfeed level entails adjusting said height of said outfeed level as a function of the hydraulic conditions prevailing at said infeed means.

4. The method as defined in claim 2, further including the steps of:

passing purified liquid from said aquatic plant-containing filter bed through at least one outfeed pipe associated with said outfeed means and having an outlet side;

connecting the outlet side of said at least one outfeed pipe to at least one flexible tube having a free open end; and said step of adjusting said height of said outfeed level entailing the step of adjusting the height of said free open end of said flexible tube.

5. The method as defined in claim 2, further including the steps of:

passing purified liquid from said aquatic plant-containing filter bed through at least one outfeed pipe associated with said outfeed means and having an upwardly directed open end; and said step of adjusting said height of said outfeed level entailing the step of adjusting the height of said upwardly directed open end of said at least one outfeed pipe by connecting said upwardly directed open end to plug-on type tubular modules of a preselectable length.

6. The method as defined in claim 2, further including the steps of:

passing purified liquid from said aquatic plant-containing filter bed through at least one outfeed pipe associated with said outfeed means and having an outlet side;

pivotably connecting at least one upwardly directed branch pipe which has a free open end, to the outlet side of said at least one outfeed pipe; and said step of adjusting said height of said outfeed level entailing the step of adjusting said pivotably connected and upwardly directed branch pipe to a preselectable pivot angle relative to said outfeed pipe.

7. A method of purifying a liquid, comprising the steps of:

passing the liquid to be purified from infeed means through an aquatic plant-containing filter bed to outfeed means;

during said step of passing said liquid to be purified through said aquatic plant-containing filter bed, setting up in said aquatic plant-containing filter bed a predetermined throughflow pattern which is adapted to the instant operating conditions of said aquatic plant-containing filter bed;

constructing at least one intentionally variable by-pass flow path by-passing said aquatic plant-containing filter bed; and varying said by-pass flow path for setting up said predetermined throughflow pattern.

8. The method as defined in claim 7, wherein:

said step of passing said liquid to be purified through said aquatic plant-containing filter bed entails passing said liquid to be purified through an aquatic plant-containing filter bed having a predetermined hydraulic conductivity; and said step of constructing said at least one by-pass flow path entailing the step of constructing at least one by-pass flow path extending substantially parallel to said aquatic plant-containing filter bed and having a higher hydraulic conductivity than said aquatic plant-containing filter bed.

9. The method as defined in claim 8, further including the steps of:

connecting said at least one by-pass flow path substantially parallel to said plant-containing filter bed to said infeed means and said outfeed means associated with said aquatic plant-containing filter bed;

said step of setting up said predetermined throughflow pattern including the steps of:

forming as said predetermined throughflow pattern, proportional throughflows through said aquatic plant-containing filter bed and said by-pass flow-path; and adjusting, on the side of said outfeed means, said proportional throughflow through said at least one by-pass flow path.

10. The method as defined in claim 9, wherein:

said step of constructing said at least one by-pass flow path entails placing as said at least one by-pass flow path, a gravel bed having a predetermined height and a predetermined length below said aquatic plant-containing filter bed and upon a water-impervious foil;

blocking said gravel bed on the side of said outfeed means by means of an outflow bar having a thickness exceeding said predetermined height of said gravel bed by a predetermined amount; and laying a predetermined number of discharge pipes such as to extend through a predetermined portion of said predetermined length of said gravel bed and through said outflow bar.

11. The method as defined in claim 10, further including the steps of:

connecting said predetermined number of discharge pipes to a common gravel bed outfeed having a variable flow cross-sectional area; and said step of adjusting said proportional throughflow through said at least one by-pass flow path including the step of adjusting the flow cross-sectional area of said common gravel bed outfeed.

12. The method as defined in claim 10, wherein:
said step of laying said predetermined number of discharge pipes entails laying a predetermined number of discharge pipes having a variable flow cross-sectional area; and
said step of adjusting said proportional throughflow through said at least one by-pass flow path including the step of independently adjusting said flow cross-sectional area of each individual one of said predetermined number of discharge pipes.

13. The method as defined in claim 10, further including the step of:
covering said gravel bed on a side facing said aquatic plant-containing filter bed, with a degradable foil which is degradable under the action of said aquatic plant-containing filter bed.

14. The method as defined in claim 10, further including the steps of:
said step of setting up said predetermined throughflow pattern includes setting up a predetermined number of adjacent zones which extend substantially transverse to the throughflow direction through said aquatic plant-containing filter bed and posses, in comparison to said aquatic plant-containing filter bed, an increased and variable hydraulic gradient;
said step of constructing said at least one by-pass flow path including the step of forming said at least one by-pass flow path by a predetermined number of substantially transverse drain pipes each of which is associated with one of said predetermined number of adjacent zones; and
placing each one of said substantially transverse drain pipes at the bottom of said aquatic plant-containing filter bed and on the downstream side of the associated zone.

15. The method as defined in claim 10, further including the steps of:
determining the height of an infeed level at said infeed means;
determining the height of an outfeed level at said outfeed means;
said step setting up said predetermined throughflow pattern entails the step of setting up as said predetermined throughflow pattern, the hydraulic gradient between the height of the infeed level at said infeed means and the height of the outfeed level at said outfeed means; and
adjusting said height of said outfeed level in order to thereby adapt said hydraulic gradient to said instant operating conditions of said aquatic plant-containing filter bed.

16. The method as defined in claim 9, wherein:
said step of constructing said at least one by-pass flow path entails embedding a predetermined number of lengthwise extending drain pipes in said aquatic plant containing filter bed; and
connecting said lengthwise extending drain pipes to a common lengthwise drain outfeed.

17. The method as defined in claim 16, wherein:
said step of embedding said lengthwise extending drain pipes includes placing said lengthwise extending drain pipes at the bottom of said aquatic plant-containing filter bed.

18. The method as defined in claim 16, wherein:
said step of connecting said lengthwise extending drain pipes entails connecting said lengthwise extending drain pipes to a common lengthwise drain outfeed having a variable flow cross-sectional area; and
said step of adjusting said proportional throughflow through said at least one by-pass flow path entailing the step of adjusting the flow cross-sectional area of said common lengthwise drain outfeed.

19. The method as defined in claim 16, wherein:
said step of embedding said predetermined number of lengthwise extending drain pipes entails embedding lengthwise extending drain pipes having a variable flow cross-sectional area; and
said step of adjusting said proportional throughflow through said at least one by-pass flow path entailing the step of independently adjusting said flow cross-sectional area of each individual one of said lengthwise extending drain pipes.

20. The method as defined in claim 16, further including the steps of:
said step of setting up said predetermined throughflow pattern includes setting up a predetermined number of adjacent zones which extend substantially transverse to the throughflow direction through said aquatic plant-containing filter bed and possess, in comparison to said aquatic plant-containing filter bed, an increased and variable hydraulic gradient;
said step of constructing said at least one by-pass flow path including the step of forming said at least one by-pass flow path by a predetermined number of substantially transverse drain pipes each of which is associated with one of said predetermined number of adjacent zones; and
placing each one of said substantially transverse drain pipes at the bottom of said aquatic plant-containing filter bed and on the downstream side of the associated zone.

21. The method as defined in claim 16, further including the steps of:
determining the height of an infeed level at said infeed means;
determining the height of an outfeed level at said outfeed means;
said step of setting up said predetermined throughflow pattern entails the step of setting up as said predetermined throughflow pattern, the hydraulic gradient between the height of the infeed level at said infeed means and the height of the outfeed level at said outfeed means; and
adjusting said height of said outfeed level in order to thereby adapt said hydraulic gradient to said instant operating conditions of said aquatic plant-containing filter bed.

22. The method as defined in claim 7, wherein:
said step of setting up said predetermined throughflow pattern includes setting up a predetermined number of adjacent zones which extend substantially transverse to the throughflow direction through said aquatic plant-containing filter bed and possess, in comparison to said aquatic plant-containing filter bed, an increased and variable hydraulic gradient;
said step of constructing said at least one by-pass flow path including the step of forming said at least one by-pass flow path by a predetermined number of substantially transverse drain pipes each of which is associated with one of said predetermined number of adjacent zones; and placing each one of said substantially transverse drain pipes at the bottom of said aquatic plant-containing filter bed and on the downstream side of the associated zone.

23. The method as defined in claim 22, further including the steps of:

connecting said predetermined number of substantially transverse drain pipes outside the aquatic plant-containing filter bed to a common transverse drain outfeed having a variable flow cross-sectional area; and said step of setting up said predetermined number of adjacent zones having said variable hydraulic gradient including the step of adjusting said variable flow cross-sectional area of said common transverse drain outfeed and thereby adjusting said variable hydraulic gradient of said adjacent zones.

24. The method as defined in claim 22, further including the steps of:

said step of placing each one of said predetermined number of substantially transverse drain pipes entails placing substantially transverse drain pipes each of which has a variable flow cross-sectional area;

connecting said predetermined number of substantially transverse drain pipes outside the aquatic plant-containing filter bed to a common transverse drain outfeed; and said step of setting up said predetermined number of adjacent zones having said variable hydraulic gradient, including the step of independently adjusting said variable flow cross-sectional area of each individual one of said substantially transverse drain pipes and thereby adjusting said variable hydraulic gradient of each associated one of said adjacent zones.

25. The method as defined in claim 22, further including the steps of:

determining the height of an infeed level at said infeed means;

determining the height of an outfeed level at said outfeed means;

said step of setting up said predetermined throughflow pattern entails the step of setting up as said predetermined throughflow pattern, the hydraulic gradient between the height of the infeed level at said infeed means and the height of the outfeed level at said outfeed means; and adjusting said height of said outfeed level in order to thereby adapt said hydraulic gradient to said instant operating conditions of said aquatic plant-containing filter bed.

* * * * *